United States Patent [19]
Scalia
[11] 4,115,180
[45] Sep. 19, 1978

[54] DISPENSER AND APPLICATOR APPARATUS FOR EDGE WRAPPING OF STAINED GLASS CHIPS AND THE LIKE WITH FOIL

[76] Inventor: Peter F. Scalia, 123 W. Chestnut St., East Rochester, N.Y. 14445

[21] Appl. No.: 824,363
[22] Filed: Aug. 15, 1977
[51] Int. Cl.[2] B32B 31/20
[52] U.S. Cl. 156/446; 156/201; 156/468
[58] Field of Search 156/107, 461, 463, 465, 156/468, 483, 484, 486, 485, 200, 201, 202, 446, 447

[56] References Cited

U.S. PATENT DOCUMENTS

| | | | |
|---|---|---|---|
| 1,924,580 | 8/1933 | Watkins | 156/107 |
| 3,290,195 | 12/1966 | Davis | 156/468 |
| 3,318,753 | 5/1967 | Whitlow | 156/461 |
| 3,473,988 | 9/1969 | Rullier et al. | 156/107 |

*Primary Examiner*—William A. Powell
*Assistant Examiner*—William H. Thrower
*Attorney, Agent, or Firm*—Martin Lukacher

[57] ABSTRACT

In order to prepare stained glass chips so that they can be assembled together into a stained glass window or other work, the edges of the chips are wrapped with foil. This foil is dispensed from a roll along a path to a wrapping roller. The roller has a groove with a step and defines portions of different widths to accommodate stained glass chips and foil of different widths. The size of the groove portions are wider than the chips so that the foil will wrap around the edges of the chip and be pushed into contact with the side of the chip lying adjacent to its edges when the chip is pressed against the groove portions. Rotation of the chip also rotates the wrapping roller which is mounted so as to be free to rotate. This pulls the foil being applied to the chip.

9 Claims, 5 Drawing Figures

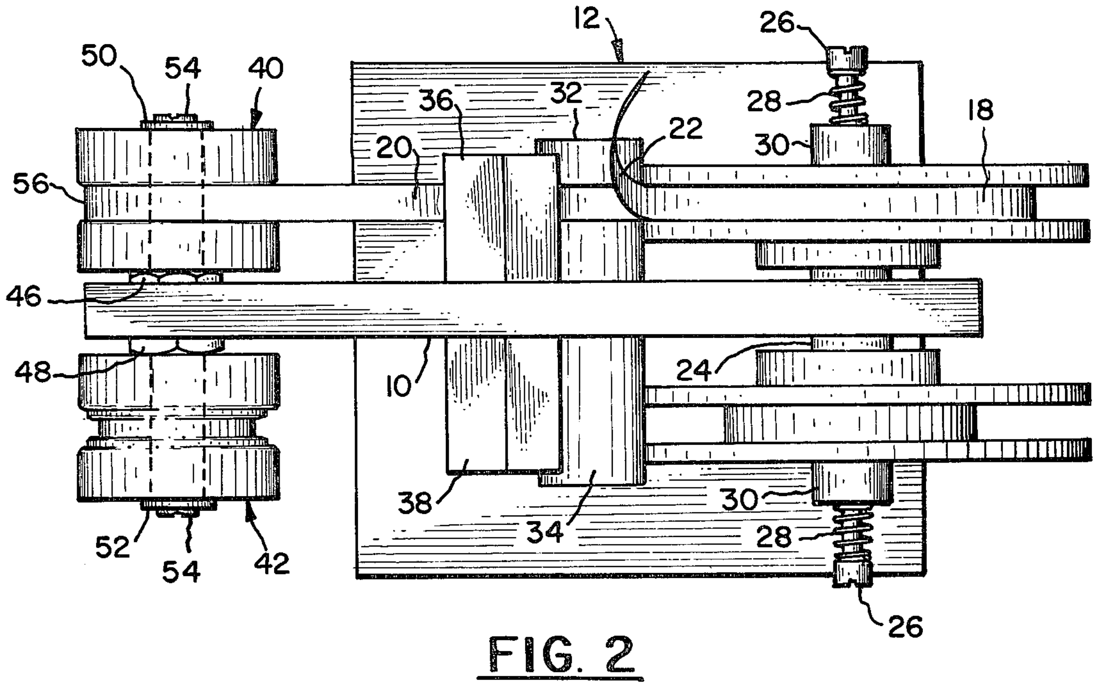
FIG. 2
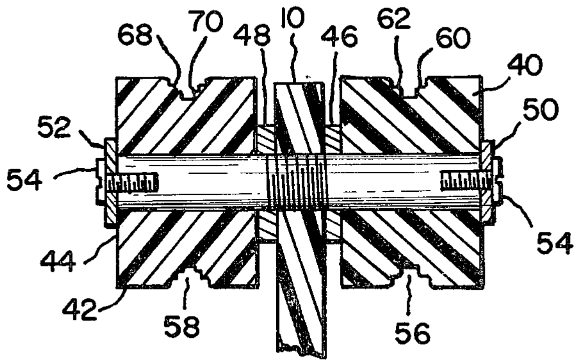
FIG. 3
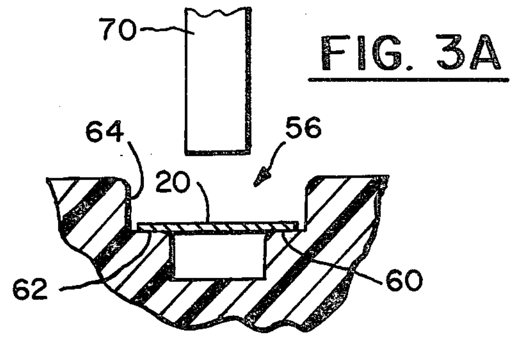
FIG. 3A
FIG. 3B
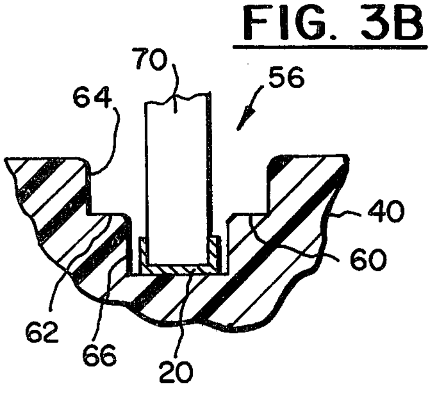

DISPENSER AND APPLICATOR APPARATUS FOR EDGE WRAPPING OF STAINED GLASS CHIPS AND THE LIKE WITH FOIL

The present invention relates to tape dispenser and applicator apparatus and particularly to apparatus for edge wrapping of glass chips of different thicknesses with foil material.

The invention is especially suitable for use in the tiffany or copper foil method of assembly of stained glass chips wherein foil placed around the edges of the chips provides a base for soldering the chips together to construct a stained glass window or other artistic work made of the chips.

The conventional method of applying foil to stained glass chips is to apply the foil by hand pressing the foil which may be self-adhering as by being coated with adhesive material on one side thereof, against the edges of the chip. The risk of injury from glass splinters in the broken edges of the chips is high even when gloves are worn while performing the work.

Foil and glass chips come in different sizes and the need exists to apply the foil around the edges of chips of different thicknesses and dimensions. It is a feature of this invention to provide apparatus which does away with the need for handling the edges of the chip where the broken glass can cause injury and which facilitates the edge wrapping of chips of different thicknesses utilizing the same apparatus. Accordingly the apparatus has universal application and will accept and apply foil, which may be in the form of a tape self-adhering on the side which faces the edges of the chips, to chips of various sizes.

Several forms of applicators for applying tape have been proposed such as in shown in U.S. Pat. No. 3,473,988, issued Oct. 21, 1969, where tape is applied to the edges of a multi-pane window. Other applicators for different purposes are proposed in U.S. Pat. Nos. 3,318,753 issued May 9,1967 and 3,290,195 issued Dec. 6, 1966. Applicator rolls for applying fabric to conform to dies and the like have been proposed in U.S. Pat. Nos. 2,309,306, issued Jan. 26, 1943 and 2,874,361 issued Feb. 17, 1959. Proposals have also been made for dispensing tape from rolls (see U.S. Pat. No. 3,529,757 issued Sept. 22, 1970). Neither the problems of applying foil to the edges of glass chips nor any apparatus capable of universal application to apply and edge wrap chips of different sizes and widths has hereto fore been available.

It is an object of the present invention to provide improved dispenser and applicator apparatus which enables the edge wrapping of stained glass chips, which may be of different thicknesses, and the like with foil.

It is a further object of the invention to provide improved apparatus which enables foil to be withdrawn and dispensed from a supply, such as a reel, while the foil is being applied around the edges of a chip.

It is a still further object of the present invention to provide an improved mechanism for wrapping foil aroung the edges of stained glass chips without the need for handling of the edges where broken glass can cause injury.

It is a still further object of the present invention to provide improved apparatus for foil wrapping of stained glass chips which has universal application and can accept and apply the foil to chips of different thicknesses, without being limited to chips of different size and peripheral dimensions.

It is a still further object of the present invention to provide improved apparatus for dispensing and wrapping foil about the edges of glass chips and the like which forms a guard to protect against injury due to broken glass at the edges of the chip as the foil is wrapped.

Briefly described, apparatus for dispensing and wrapping tape about the edges of glass chips and the like which embodies the invention makes use of a frame. A roll of self-adhering foil is rotatably mounted on the frame. A wrapping roller is spaced from the roll for receiving the foil from the roll with the self-adhering face of the foil facing upwardly. The roller has a peripheral groove. The groove has steps on opposite sides thereof which defines a first portion of larger width above the step and a second portion of smaller width below the step. These portions define the sides of the groove such that the groove is provided with a series of different widths which are progessively narrower in a direction inwardly towards the axis of the roller. The foil which is used has a width more narrow than the width of at least one of the portions so that the foil bridges the portion and extends across the step. The roller is mounted on the frame so as to be free to rotate. The chip to be wrapped is inserted into the groove and is received within the portion which is slightly wider than the chip. The chip presses the foil against the side of the portion within which it is received and either the bottom of the groove or one of the steps. The chip is turned and causes the wrapping roller to turn while simultaneously withdrawing the foil from the roll. The foil is thus wrapped about the edges of the chip without requiring any contact with the broken glass at the edges of the chip except within the confines of the wrapping roller, where the edges of the glass are protected against coming into contact with the hand of the operator. The foil may be safely wrapped around the edges of the chip. The wrapping roller may be provided with a large number of steps such that chips; of different thickness may be accommodated and make use of the dispenser and applicator apparatus.

The foregoing and other objects, features and advantages of the invention as well as a presently preferred embodiment thereof will become more apparant from a reading of the following description in connection with the accompanying drawings in which:

FIG. 2 is a top view of the apparatus shown in FIG. 1;

Figure 1:
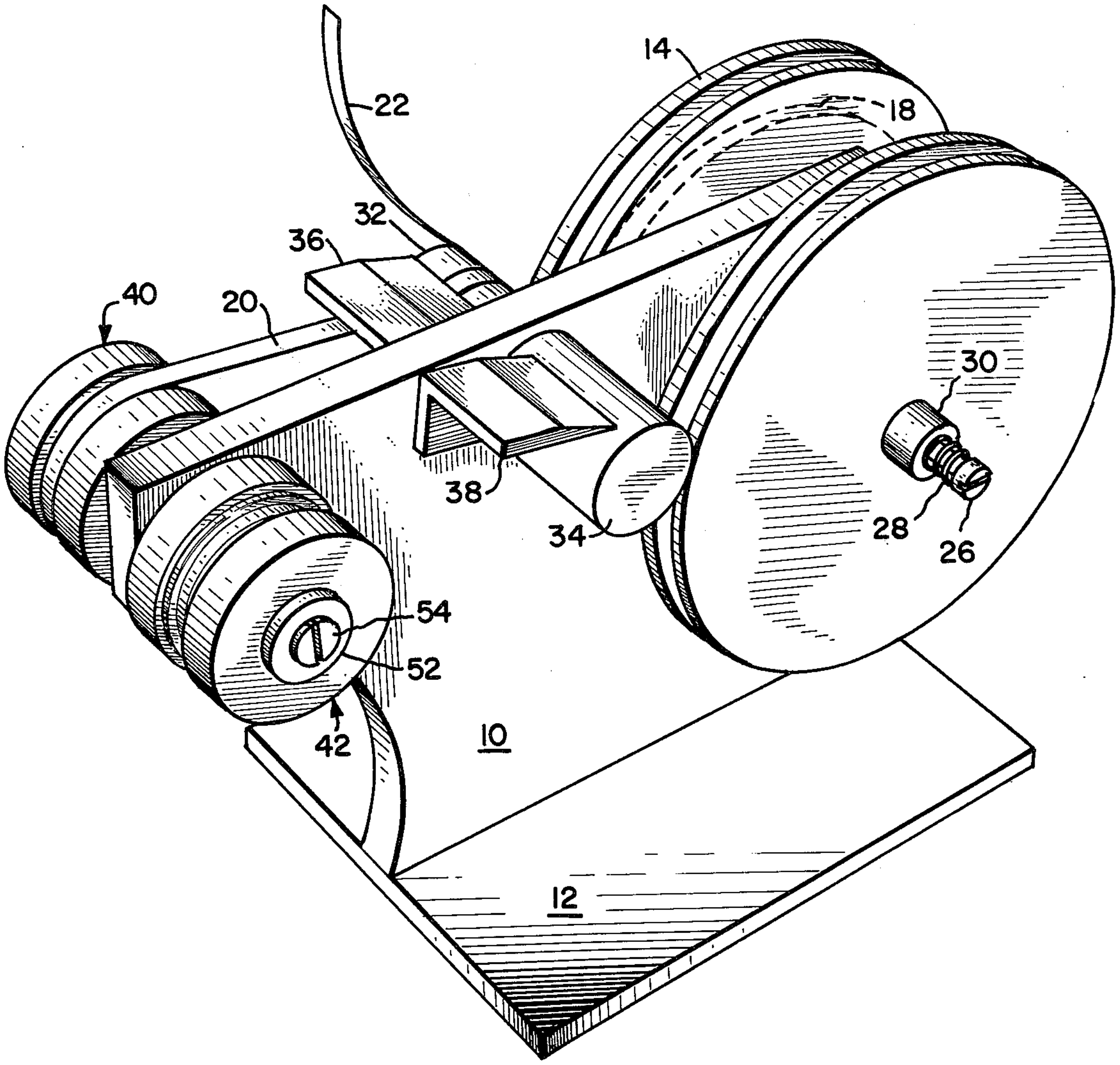
FIG. 1 is a perspective view of a foil dispenser and applicator apparatus for edge wrapping of stained glass chips and the like with foil, which apparatus embodies the invention.

FIG. 3 is a sectional view taken diametrically through the wrapping rollers shown in FIGS. 1 and 2: and FIG. 3A and 3B are enlargements of a portion of FIG. 3 showing the operation of the apparatus Referring more particularly to the drawings, a frame 10 which stands on a base 12 supports a pair of reels 14 and 16 on opposite sides thereof. Rolls of foil are mounted in the reels. One such roll 18 is shown in the drawing. The foil on the roll may hold a copper foil 20 having self-adhering material such as an adhesive on one face thereof. This face is covered by a backing strip 22.

The reels 14 and 16 are rotatably mounted on a shaft 24 which is fixed to the frame 10. In order to mount the rolls 18, the outer sides of the reels are removed by detaching screws 26 around which springs 28 are disposed. These springs bias sleeves 30 against the outsides of the reels 14 and 16. The sleeves 30, the springs 28 and the heads of the screws 26 provide a friction clutch mechanism which apply back tension to the reels. The reels 14 and 16 rotate only when the foil is pulled therefrom.

The path of the foil extends over guide rollers 32 and 34 to stripper bars 36 and 38 where the backing 2 is removed from the foil 20 as it passes under a stripper bar 36 and 38 while the backing 22 passes over that bar. The guide rollers 32 and 34 and the stripper bars are attached to the frame 10. The path of the tape 20 extends to wrapping rollers 40 and 42. These rollers 40 and 42 are mounted on a shaft 44 which may be attached to the frame 10 by bolts 46 and 48 located on opposite sides of the frame 10. The rollers are free to rotate on the shaft 44, while being held against lateral movement by washers 50 and 52 which are attached to the ends of the shaft 44 by screws 54.

The rollers 40 and 42 have peripheral grooves 56 and 58 therein. The groove 56 in the roller 40 has steps 60 and 62 so that the portion 64 of the groove 56 above the step is wider than the portion 66 of the groove below the steps. The grooves 58 and the other roller 42 has two pairs of steps 68 and 70 which define three groove portions of progressively narrower width extending inwardly of the roller. The foil 20 may be of different widths and different width foils may be mounted in different ones of the reels 14 and 16. The foil bridges at least one of the groove portions, e.g., 64 or 66 and is seated on the step (see FIG. 3A). Accordingly, foils of different width are adapted to be received in the grooves.

The width of the foil which is used depends upon the thickness of the glass chip 70 which is to be wrapped with the foil 20. The chip is inserted into the groove where it contacts the self-adhering face of the foil 20. The self-adhering face lies upwardly as the tape 20 is disposed in the grooves 56 or 58. The glass chip 70 is then pressed downwardly so as to press the foil against either the bottom of the groove as shown in FIG. 3B, or if the upper portion 64 were used, along the steps 60 and 62. The chip 70 is rotated while it is pressed against the bottom of the groove 56. The chip also is moved sidewise and pressed against the sides of the groove portion 62; thus causing the foil to adhere to the sides of the chip along the edges thereof. As the chip is rotated, the wrapping roller 56 or 58 also rotates and the tape is pulled and withdrawn from the reel 14 or 16. The edges of the chips which are broken glass and may contain glass splinters are always protected below the peripheral surface of the rollers 40 and 42 so that injury to the hand holding the chip 70 is prevented. Inasmuch as a plurality of portions of progressively narrower widths are provided in the grooves various chips of different widths can be handled and edge wrapped through the use of the apparatus. There is practically no limitation as to the dimensions of the chips, not only as regards thickness but as regards lateral dimensions. Accordingly, the apparatus has universal application with chips of various sizes.

The frame 10, the wrapping rollers 40 and 42 and the drive rollers 32 and 34 may be made of plastic material such as acrylic resin. Such resin is sold under the trade name "Plexiglass". This material is transparent so that the wrapping operation and the withdrawal of the foil 20 from the reels 14 and 16 can continuously be observed during operations.

From the foregoing description it will be apparent that there has been provided improved apparatus for dispensing and wrapping foil which is self-adhering on one face to bodies such as stained glass chips. Variations and modifications in the herein described apparatus within the scope of the invention will undoubtedly suggest themselves to those skilled in the art. Accordingly, the foregoing description should be taken as illustrative and not in any limiting sense.

What is claimed is:

1. Apparatus for dispensing and wrapping foil about the edges of glass chips and the like, said apparatus comprising a frame, means mounted on said frame for supporting a roll of self-adhering foil with the roll being rotatable as the foil is withdrawn therefrom, and a wrapping roller for receiving said foil from said roll with the self adhering face of said foil facing upwardly, said roller having a peripheral groove, said groove having steps on opposite sides thereof with the groove having a first portion thereof above the step wider than a second portion thereof below the step, one of said portions having a width narrower than the width of the foil, means mounted on said frame for supporting said roller with said roller being free to rotate as one of said chips is received within said groove within at least one of said portions and presses to said foil against the sides of said one of said portions within which it is received and one of the bottom of said groove and said steps while turning said chip to simultaneously withdraw said tape from said roll and wrap said foil about the edges of said chip.

2. The invention as set forth in claim 1 wherein said groove has a plurality of said steps, said steps being of successively smaller diameter in a direction inwardly of said roller, said steps defining a plurality of portions of widths which are successively narrower inwardly of said roller, with the one of said steps of largest diameter having said first portion thereabove and said second portion therebelow, said steps being adapted to receive foil of successively narrower widths and each of said portions being adapted to receive chips of successively narrower width whereby to provide for the wrapping of the foil about different chips having a plurality of widths.

3. The invention as set forth in claim 2 wherein a pair of said roll mounting means is provided for supporting a pair of said rolls on opposite sides of said frame, a pair of said rollers also being provided, said rollers each having a groove and steps with the groove and steps in one of said rollers providing portions of different width than the groove and step in the other of said rollers, said rollers also being mounted on opposite sides of said frame for receiving foil and chips of different widths therein.

4. The invention as set forth in claim 1 wherein said means mounting said roll of foil includes means for applying back tension to said foil as it is withdrawn therefrom.

5. The invention as set forth in claim 4 wherein said back tension applying means is a friction clutch.

6. The invention as set forth in claim 1 wherein said foil is adapted to have a backing strip on the adhering face thereof, and a stripper bar mounted on said frame between said roller and said roll for separating said backing strip from said foil.

7. The invention as set forth in claim 6 further comprising foil guide means mounted on said frame between said stripper and said roll for defining a path for said foil into said stripper.

8. The invention as set forth in claim 7 wherein said guide means is a cylindrical post.

9. The invention as set forth in claim 1 wherein said roller consists of an acrylic plastic material.

* * * * *